United States Patent [19]

Hubert et al.

[11] Patent Number: 4,922,528
[45] Date of Patent: May 1, 1990

[54] CIRCUITRY FOR RECOGNIZING TWO-TONE COMPOUND SIGNALS IN TELEPHONE INSTALLATIONS

[75] Inventors: Christian Hubert; Rainer Janssen, both of Paderborn, Fed. Rep. of Germany

[73] Assignee: Nixdorf Computer AG, Paderborn, Fed. Rep. of Germany

[21] Appl. No.: 173,510

[22] Filed: Mar. 25, 1988

[30] Foreign Application Priority Data

Mar. 31, 1987 [DE] Fed. Rep. of Germany ....... 3710695

[51] Int. Cl.⁵ .............................................. H04M 1/50
[52] U.S. Cl. .................................... 379/386; 379/283; 340/825.73
[58] Field of Search ....................... 340/825.48, 825.73; 379/283, 386

[56] References Cited

U.S. PATENT DOCUMENTS

| | | | |
|---|---|---|---|
| 3,649,771 | 3/1972 | Flowers | 379/283 X |
| 4,042,788 | 8/1977 | Richards | 379/283 X |
| 4,107,475 | 8/1978 | Carlquist et al. | 340/825.73 |

OTHER PUBLICATIONS

"Add DTMF Generation ane Decoding to DSP-μP Designs" P. Mock, EDN Mar. 21, 1985, pp. 205-220.

Primary Examiner—Jin F. Ng
Assistant Examiner—Randall S. Vaas
Attorney, Agent, or Firm—Dykema Gossett

[57] ABSTRACT

A circuit is described for recognition of two-tone compound signals of two frequency ranges (F1 to F4, F5 to F8) in telephone installations with a limited transmission band width. Band pass filters (11, 12) whose output signals are added up and weighted individually are provided in a number corresponding to the number of possible single tones. The weighted output signals are each compared with the output signal sum of one of two frequency ranges (F1 to F4, F5 to F8 ) in order to signal a valid single tone. To increase the certainty of speech, another summand (Su, So) that is derived from a summation of the output signals of at least two other band pass filters (13) whose mid-band frequencies (F9 to F11) are outside the two frequency ranges (F1 to F4, F5 to F8) is also sent to the summation circuit.

6 Claims, 2 Drawing Sheets

CIRCUITRY FOR RECOGNIZING TWO-TONE COMPOUND SIGNALS IN TELEPHONE INSTALLATIONS

TECHNICAL FIELD

This invention concerns circuitry for recognizing two-tone compound signals of two frequency ranges in telephone systems with a limited transmission band width, with a number of parallel band pass filters corresponding to the number of possible single tones where the output signals of the upper and lower frequency ranges of the band pass filters are added and weighted individually, whereupon the weighted output signals are compared to the output signal sum of their frequency range in order to signal the occurrence of a valid single tone at the common input of the band pass filters.

BACKGROUND OF THE INVENTION

A circuit of the general type described above is disclosed in the journal "Electronic Design News" of Mar. 21, 1985, pages 205 to 220, where it is diagrammed in FIG. 7 on page 216. In addition to the band pass filters provided for the possible single tones, it also contains the same number of additional band pass filters tuned to the first harmonic of the mid-band frequency of a band pass filter for each individual single tone. These additional band pass filters in combination with an additional analyzer circuit provided for them serve to increase the speech certainty in recognizing of two-tone multifrequency signals. When a single tone together with its first harmonic is recognized, then it can be assumed with greater certainty that this single tone is invalid, i.e., it can be attributed to the transmission of speech frequencies, because the two-tone compounds signals are transmitted in the form of the purest possible sinusoidal tones so they are almost free of harmonics.

The circuit described above thus needs twice the number of band pass filters in comparison with the number of possible single tones plus twice the analyzer circuits to recognize the two-tone compound signals. When embodied in digital technology, the scanning frequency required for operation must have at least four times the value of the highest single-tone frequency or at least twice the value of the highest harmonic frequency that occurs. This requires very short computation times in signal analysis, so this in turn limits the number of possible transmission channels a computer can analyze.

SUMMARY OF THE INVENTION

The purpose of the present invention is to provide a circuit for recognition of two-tone compound signals so a speech certainty at least as good as that of the circuits known in the past can be achieved without using the principle of overtone analysis.

This objective is achieved according to the invention by performing a summation with another summand that is the result of summation of the output signals of at least two other band pass filters whose center frequencies are outside the two frequency ranges.

This invention is based on the recognition that speech signals whose frequencies are within the frequency ranges provided for the multifrequency signals always contain additional frequencies outside these frequency ranges. For example, if only two other band pass filter are provided whose center frequencies are outside the two frequency ranges, then they will also receive such additional frequencies of the speech signals. Then, when the output signals of the two other band pass filters are added up and the result of this summation is sent to the band pass filter receiving the single tones as the additional summand of the summation, it is possible to control the comparison performed for signal analysis through the appropriately influenced reference parameter in such a way that the received single tones are not analyzed as valid compound signals when speech frequencies occur at the same time. In this way, a high speech certainty is achieved with the additional expense of at least two additional band pass filters plus the respective summation circuits. When circuitry that functions in this way is embodied in digital technology, the scanning frequency for operation need have only at least twice the value of the highest single-tone frequency. Then, the analysis time available between individual scanning operations is twice as long as that with the known methods.

The center frequencies of the two band pass filters are preferably approximately in the middle of the frequency ranges that occur within the transmission band width outside the frequency ranges for the single tones. This is appropriate because this yields the greatest possible distance from the respective frequency range, and speech frequencies can be detected unambiguously.

An especially advantageous refinement of this invention is characterized by the fact that there is a summation of the output signals of three other band pass filters whose center frequencies are beneath, between and above the two frequency ranges for each of the two frequency ranges, in which case the output signals of the band pass filter with the lowest center frequency and with the highest center frequency for the lower and upper frequency ranges respectively undergo a phase shift of 180 degrees.

As a result of this measure, a summand whose frequency-dependent size can be optimized for signal analysis of the frequency range for which it is used is created for each of the two frequency ranges.

If the output signals of the other band pass filters are weighted before summation, then this permits an adaptation of each individual output signal of this band pass filter and thus an adaptation of the summation characteristics of these output signals to the properties of speech transmission.

BRIEF DESCRIPTION OF THE DRAWINGS

One practical example of this invention will be illustrated below with reference to figures.

DETAILED DESCRIPTION OF THE PREFERRED EMBODIMENT

Figure 1:
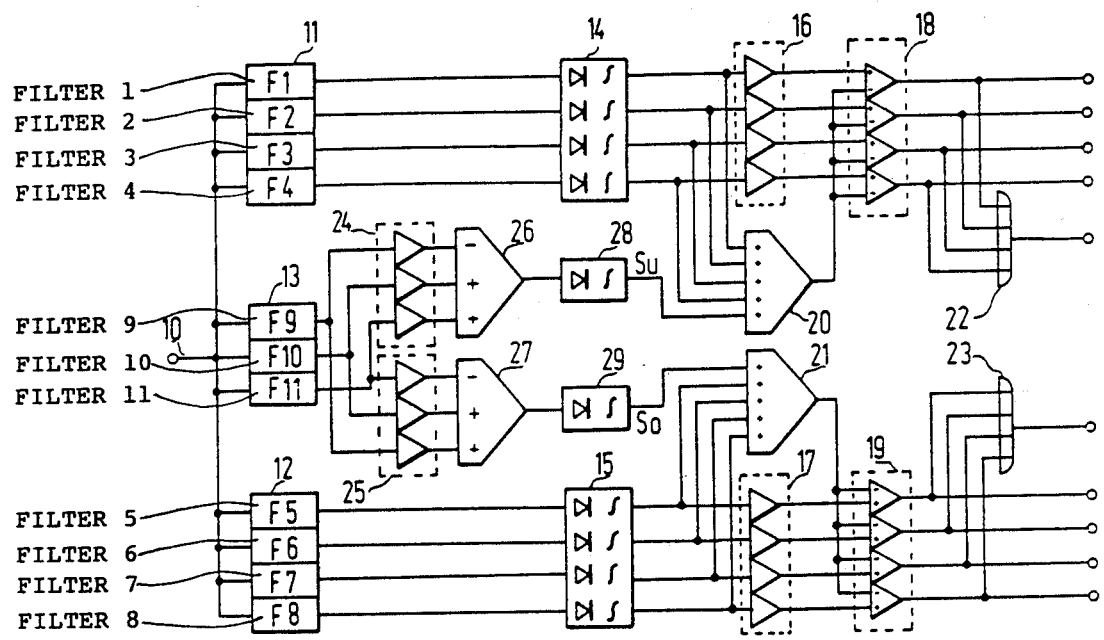
FIG. 1 is a schematic block diagram of a circuit according to this invention, where three other band pass filters and two summation channels are provided.

FIG. 1 shows a receiving circuit for two-tone compound signals connected to a signal input 10 with a total of 11 band pass filters forming groups 11, 12 and 13.

Band pass filter group 11 has the mid-band frequencies F1 to F4, band pass filter group 12 has mid-band frequencies F5 to F8, and band pass filter group 13 has mid-band frequencies F9 to F11. The two band pass filter groups 11 and 12 are tuned to the multifrequency signals and can thus receive two tones in the two frequency ranges F1 to F4 and F5 to F8. Frequency values F1 to F4 and F5 to F8 can be based on the CCITT standard, for example, and then are in two frequency ranges where frequency range F1 to F4 is the lower frequency range and frequency range F5 to F8 is the upper frequency range.

The center frequencies of band pass filter group 13 are of a size such that they are approximately in the middle of the frequency ranges that are outside frequency ranges F1 to F4 and F5 to F8 but within the transmission band width. The transmission band width can be considered here with or without including the signaling tone range.

The output signals of band pass filter group 11 are sent to a rectification and effective value forming circuit 14. A corresponding circuit 15 is provided for the output signals of band pass filter group 12. The effective values of the output signals of the two band pass filter groups 11 and 12 are then sent in each frequency range to a weighting circuit 16 or 17 whose output signals are supplied to the non-inverting inputs of a comparator group 18 and 19. The inverting inputs of the respective comparator group 18 or 19 together receive the output signal of a summation element 20 or 21 that adds up the effective values of the output signals of the respective band pass filter group 11 and 12 as well as a signal Su or So which is generated as described below.

The output signals of comparator groups 18 and 19 form the output signals of the receiving circuit and are sent to another signal analyzer (not shown in FIG. 1). In addition, they are each sent to an OR gate 22 or 23 whose output signal denotes the occurrence of a valid single tone in the respective frequency range and can likewise be sent to another analyzer.

The operation described above for the circuit shown in FIG. 1 for the upper and lower frequency range is essentially known apart from the step of supplying the additional summands Su and So to the summation circuits 20 and 21. The interaction of the respective weighting circuits 16 and 17 with the respective comparator group 18 or 19 for each single tone within a very narrow frequency range without requiring band pass filters with very steep slopes of their transmission characteristics for the two band pass filter groups 11 and 12.

The two additional summands Su and So are produced from the output signals of band pass filter group 13 by adding them up in two summation channels and subjecting them to formation of a root mean square value. In each summation channel, the three output signals are sent across a weighting circuit 24 or 25 where they can be adapted individually to a given curve of the frequency response of the entire circuit. Then they are added up by channel in a summation circuit 26 or 27. The respective output signal sum is sent as the summand Su or So to the respective summation circuit 20 or 21 by way of a rectifying and effective value forming circuit 28 and 29.

Summation of the three output signals of band pass filter group 13 takes place in such a way that the output signal with the lower frequency F9 is added up in the summation element 26 with a negative sign, and the output signal with the frequency F11 is added up in summation element 27 with a negative sign. Thus, a phase shift of 180 degrees is achieved for these two output signals in the respective summation process, and this phase shift can also be achieved by the fact that there is a corresponding inversion in the respective weighting circuit 24, 25.

Figure 2:
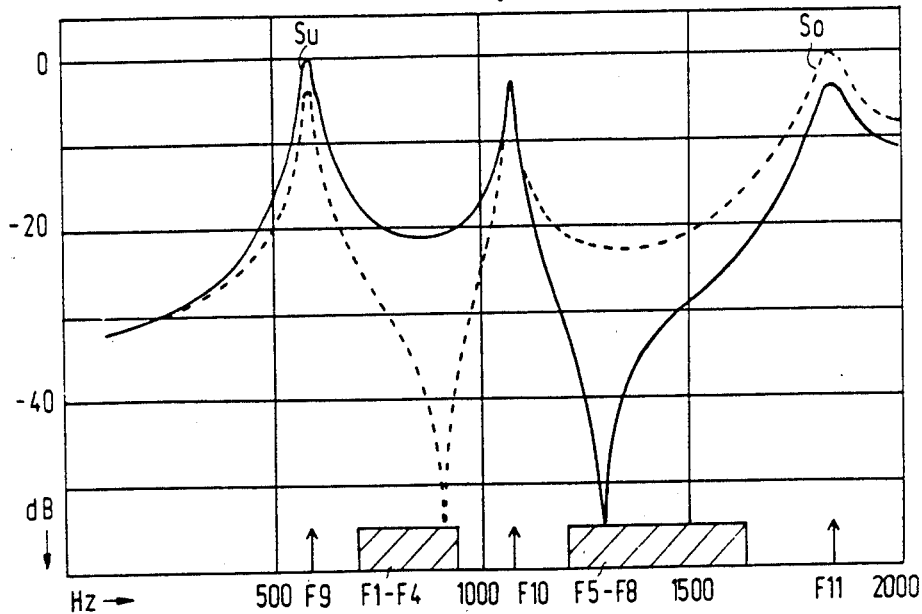
FIG. 2 shows the frequency response of the two summands produced with the circuit according to FIG. 1 for the upper and lower frequency ranges.

FIG. 2 shows the frequency response of the two summands Su and So as a solid line and a dotted line, respectively. The center frequencies F9, F10 and F11 of band pass filter group 13 (FIG. 1) are each indicated by an arrow. These frequencies are positioned in the manner described here in such a way that they are located outside the two frequency ranges for the two-tone compound signals. It can be seen that summands Su and So have peaks at each of the three frequencies F9, F10 and F11 and two summands have a common peak at the frequency F10. This frequency response shows clearly that the summand Su in the range of frequencies F1 to F4 which is indicated with hatching as the lower frequency range in FIG. 2 experiences especially low attenuation and the same effect also occurs for the summand So in the upper frequency range F5 to F8 which is likewise shown as hatched in the figure. The summand Su experiences a high attenuation in the upper frequency F5 to F8. Likewise, summand So experiences high attenuation in the lower frequency range F1 to F4. This is reasonable, because summands Su and So introduce speech evaluation into the summation process carried out with summation circuits 20 and 21 (FIG. 1). This speech evaluation is carried out separately for the two frequency ranges F1 to F4 and F5 to F8, because the respective summand Su or So should contain as little as possible of the frequency range for which it is not used for speech evaluation.

Figure 3:
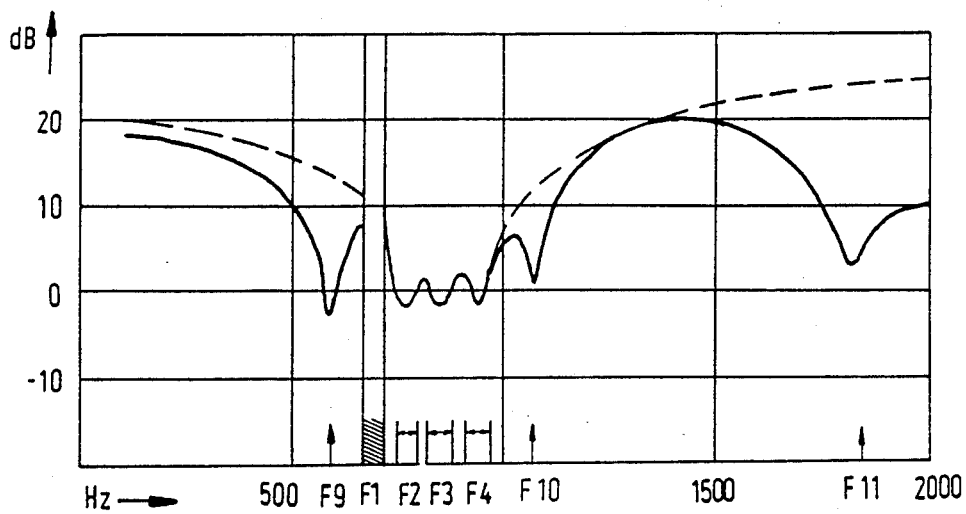
FIGS. 3 and 4 show the frequency response of attenuation of the circuit according to FIG. 1 involving the reception of a two-tone compound signal with two predetermined frequencies.
Figure 4:
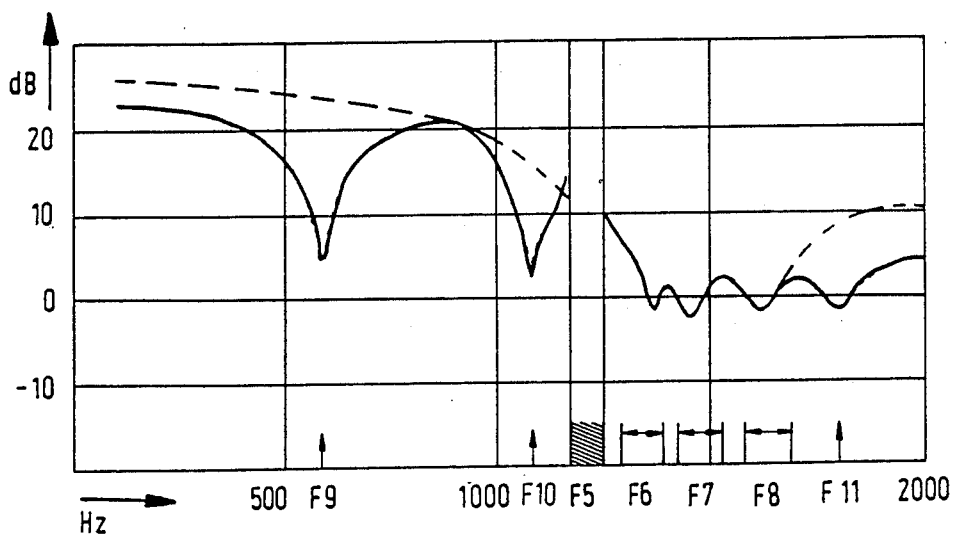

FIGS. 3 and 4 show the frequency response of attenuation of the circuit according to FIG. 1 in the case of reception of a two-tone compound signal with frequencies F1 to F5. FIG. 3 shows the frequency response for the lower frequency range F1 to F4 and FIG. 4 shows the frequency response for the upper frequency range F5 to F8. This also shows the frequency response with dotted lines that would occur without the speech evaluation provided according to this invention. Thus, the effects that can be achieved with this invention can be seen directly. The frequency response shown with solid lines is the result of the summation process performed with summation circuits 20 and 21 (FIG. 1). FIGS. 3 and 4 in agreement with FIG. 2 show the mid-band frequencies F9, F10 and F11 of the additional band-pass filter group 13 (FIG. 1) and it can be seen here that the frequency response of the attenuation achieved by the additional summands Su and So also has a minimum in the range of the mid-band frequencies F9, F10 and F11. This shows that the three mid-band frequencies F9, F10 and F11 are evaluated especially strongly when one of them occurs together with a two-tone compound signal. Due to this heavy weighting of a speech frequency signal, summation in the respective summation circuit 20, 21 (FIG. 1) is influenced in such a way that the respective comparator group 18 or 19 changes its decision threshold regarding whether the simultaneously received single tone of the two-tone compound signal is a valid single tone or not in such a way that this single tone is then evaluated as invalid.

FIGS. 3 and 4 show a range of limited band width where the attenuation curve is interrupted for frequencies F1 and F5. This is the respective frequency band in which single tones with the frequency F1 or F5 may occur, taking into account given tolerances. If, in deviation from the examples shown in FIGS. 3 and 4, a two-tone compound signal with other single tones is received, then an attenuation curve with a minimum like the sections shown in FIGS. 3 and 4 for the remaining frequencies of the upper and lower frequency range is obtained in the range F1 and F5.

The weighting circuits 24 and 25 that have already been described (FIG. 1) permit a change in the minimums introduced for frequencies F9, F10 and F11 into the attenuation curve according to FIGS. 3 and 4. It is thus possible to optimize the overall response of the circuit shown in FIG. 1 to the characteristics of human speech or the properties of the transmission channel used in each case. Furthermore, this makes it possible to place the decision-making criterion with the circuitry according to FIG. 1 regarding whether interfering speech signals are to be recognized as such or not at predetermined thresholds. This makes it very simple to place the decision threshold in a range where speech signals that can be attributed to cross talk are evaluated and allowed whereas speech signals whose amplitudes are on the order of the given amplitudes of two-tone compound signals are evaluated as unallowed.

We claim:

1. A circuit for recognizing two-tone compound signals formed of first and second tones respectively selected from first and second pluralities of tones which respectively lie in upper and lower frequency ranges in telephone installations having a limited transmission band width, with a bandpass filter corresponding to each of the tones in said first and second pluralities thereof and where the first and second tones which are output from the bandpass filters are added up in a summation circuit and weighted individually to form a pair of weighted output signals, and wherein the weighted output signals are each compared to the sum of the signals output from the bandpass filters of the corresponding frequency range in order to signal the occurrence of a valid single tone input to said circuit, said circuit comprising:

at least a pair of summing means; and, at least first and second additional bandpass filters (13) having mid-band frequencies (F9 to F11) outside said upper and lower frequency ranges (F1 to F4, F5 to F8), said additional bandpass filters having outputs respectively connected to said pair of summing means, said summing means having outputs coupled with said summation circuit for delivering a summand to said summation circuit.

2. Circuit according to claim 1, wherein one of the mid-band frequencies (F9 to F11) is approximately in the middle between the frequency (F4) of the top single tone in the lower frequency range (F1 to F4) and the frequency (F5) of the bottom single tone in the upper frequency range (F5 to F8).

3. Circuit according to claim 2, wherein another of the mid-band frequencies is approximately in the middle between the frequency (F8) of the top single tone of the upper frequency range (F5 to F8) and the upper limit of the transmission bandwidth.

4. Circuit according to claim 2, wherein another mid-band frequency (F9) is approximately in the middle between the frequency (F1) of the bottom single tone of the lower frequency range (F1 to F4) and a frequency that is given by the lower limit of the transmission band width or by the upper limit of the signalling tone range.

5. Circuit according to claim 1, wherein there is further provided a third additional bandpass filter, the output signals of said first, second and third additional bandpass filters (13) having mid-band frequencies (F9 to F11) respectively beneath, between and above said upper and lower ranges (F1 to F5, F8 to F8) and being added to each of the first and second tones, whereby the output signal of the bandpass filter with the lowest mid-band frequency and that with the highest mid-band frequency (F9 or F11) are phase-shifted 180 degrees.

6. Circuit according to claim 1, wherein the output signals of said additional band pass filters (13) are weighted before summation (in 24, 25).

* * * * *